United States Patent [19]

Becker et al.

[11] Patent Number: 4,503,509
[45] Date of Patent: Mar. 5, 1985

[54] CALIBRATOR FOR TIMING METER

[75] Inventors: Thomas P. Becker; Christopher B. Stout, both of Kenosha; Gene P. Hopp, Racine, all of Wis.

[73] Assignee: Snap-on Tools Corporation, Kenosha, Wis.

[21] Appl. No.: 402,843

[22] Filed: Jul. 29, 1982

[51] Int. Cl.³ .................. G05B 23/02; G01P 21/00; G01P 3/481
[52] U.S. Cl. .................. 364/571; 73/1 R; 364/550; 377/20
[58] Field of Search .......... 364/571, 578, 701, 551; 73/1 R, 2, 5; 377/19, 20, 44

[56] References Cited

U.S. PATENT DOCUMENTS

| | | | |
|---|---|---|---|
| 3,866,024 | 2/1975 | Williams | 377/44 |
| 3,983,480 | 9/1976 | Meserow et al. | 73/1 R X |
| 3,996,453 | 12/1976 | Coia | 377/44 X |
| 4,293,916 | 10/1981 | Delre et al. | 364/578 X |
| 4,300,205 | 11/1981 | Tansuwan | 364/578 |
| 4,310,802 | 1/1982 | Ichimiya et al. | 364/701 X |

Primary Examiner—Felix D. Gruber
Attorney, Agent, or Firm—Emrich & Dithmar

[57] ABSTRACT

An oscillator provides a series of pulses to the first of a plurality of cascaded counters. The BCD outputs of each counter provide a particular digit in the number of pulses counted during selected intervals. At least two AND means are coupled to respective sets of the counter outputs to provide speed signals when the corresponding numbers of pulses have been counted. A selected one of such signals resets the counters and also provides an inductive output for the magnetic probe of a timing meter. Additional AND means are respectively coupled to different sets of the counter outputs and provide timing signals when their respective numbers of pulses have been counted. A selected one of the timing signals energizes an LED which produces a light flash for the luminosity probe of the timing meter.

16 Claims, 8 Drawing Figures

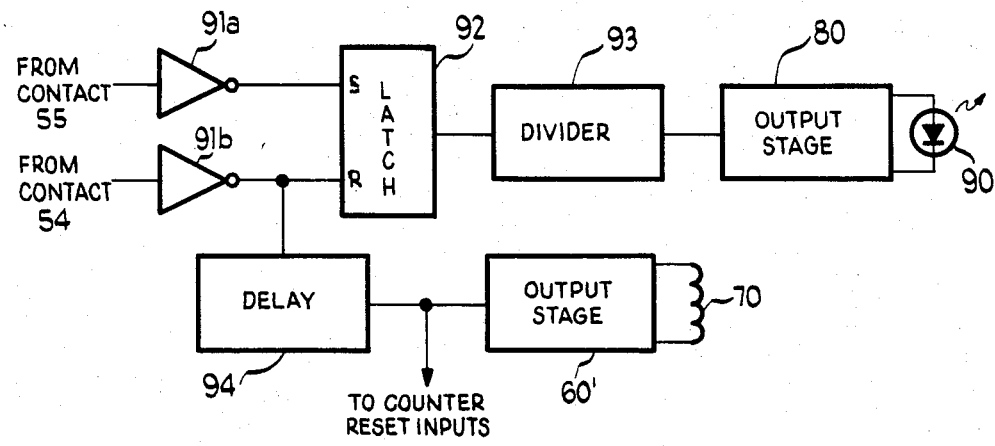
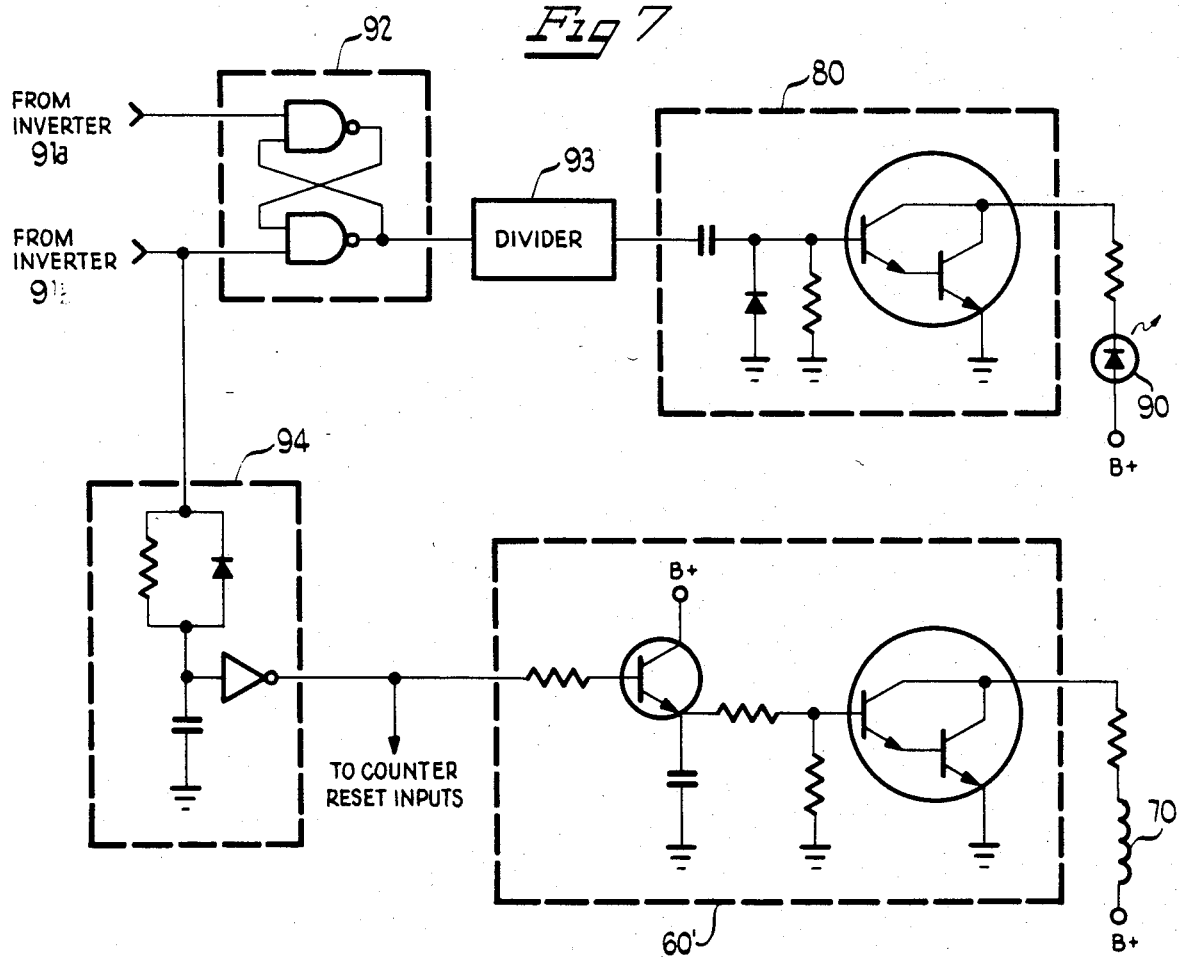

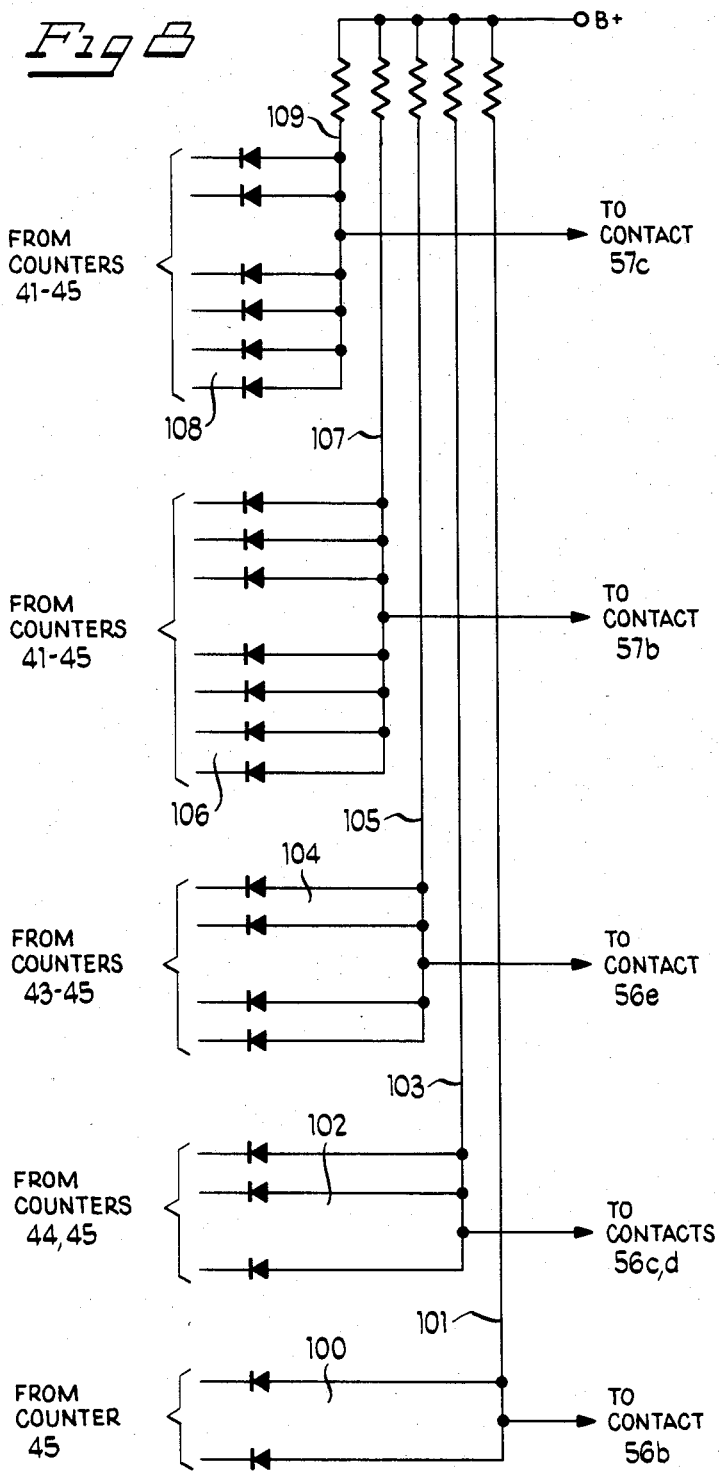

CALIBRATOR FOR TIMING METER

BACKGROUND OF THE INVENTION

In analyzing the timing of an engine, the engine speed and timing angle must be determined. The timing angle is the number of degrees of revolution of the crankshaft angle between top-dead-center of a selected cylinder and combustion in that cylinder. Automobile manufacturers commonly specify the number of degrees at a specific engine speed as a compromise to numerous considerations which must be taken into account.

Top dead center is identified in the following manner. The engine includes a wheel mounted on the end of the engine crankshaft so as to rotate therewith. A notch or other marking means is located in the periphery of the wheel. The receptacle for a magnetic probe is positioned on the engine block and is so located that the notch on the rotating wheel will pass the receptacle a known number of degrees of crankshaft rotation after the number one, or other selected cylinder, has reached its top-dead-center position.

The combustion event may be sensed in a number of ways. For example, in a spark-ignited engine a clip is normally applied to the conductor associated with a selected spark plug which produces pulses corresponding to the combustion event. In a diesel engine, the combustion event could be sensed by light occurring during combustion. The glow plug for the prechamber associated with the selected cylinder is removed and a luminosity probe is inserted in its place. The luminosity probe includes a sensor which responds to light produced during combustion and generates an electrical signal.

It is important that the readings furnished by the timing meter be accurate. For example, if the meter indicates that the engine speed is 1,200 rpm and/or that the timing angle is 20°, such readings must be correct. A calibrator is used to provide signals of known and appropriate values to the meter so that the displayed values can be checked for function and accuracy.

SUMMARY OF THE INVENTION

It is therefore an important object of the present invention to provide an improved timing meter calibrator which is self contained and portable.

Another object is to provide a timing meter calibrator which utilizes digital techniques so as to achieve accuracy yet economy of circuitry.

In summary, there is provided a calibrator for a timing meter which includes a combustion detector for producing a signal in response to the occurrence of combustion in an engine, a TDC detector for producing a signal in response to a top-dead-center event and, a display for engine speed, a display for timing angle, the calibrator being operative to check the engine speed display at least at first and second engine speeds and to check the timing angle display at least at first and second timing angles, the calibrator comprising an oscillator for generating a series of oscillator pulses, a plurality of cascaded counters responsive to pulses from the oscillator and generating outputs respectively corresponding to the digits in the number of the oscillator pulses counted during a given period, each counter having a plurality of outputs on which appear electrical signals representing the numerical value of the digit corresponding to such counter, the first engine speed corresponding to electrical signals on a first set of outputs of the counters, the second engine speed corresponding to electrical signals on a second set of outputs of the counters, first circuit means responsive to the electrical signals on a selected one of the first and second sets of outputs to generate a reset signal and a speed enable signal, the reset inputs of at least some of the counters being coupled to the first circuit means and being responsive to the reset signal to become reset, inductive means coupled to the first circuit means and being responsive to the speed enable signal to produce an inductive signal for the magnetic probe, the first timing angle corresponding to electrical signals on a third set of outputs of the counters, the second timing angle corresponding to electrical signals on a fourth set of outputs of the counters, second circuit means responsive to the electrical signals on a selected one of the third and fourth sets of outputs to generate a timing enable signal, and combustion means coupled to said second circuit means and being responsive to the timing enable signal to produce a signal for the combustion detector.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its construction and operation, and many of its advantages should be readily understood and appreciated.

FIG. 6 is a block diagram of an alternative embodiment of a portion of the calibrator;

FIG. 7 is a partly schematic and partly logic diagram of certain of the electronic circuitry in the calibrator of FIG. 6; and FIG. 8 depicts another embodiment of a portion of the calibrator.

DETAILED DESCRIPTION OF THE PREFERRED EMBODIMENTS

Figure 1:
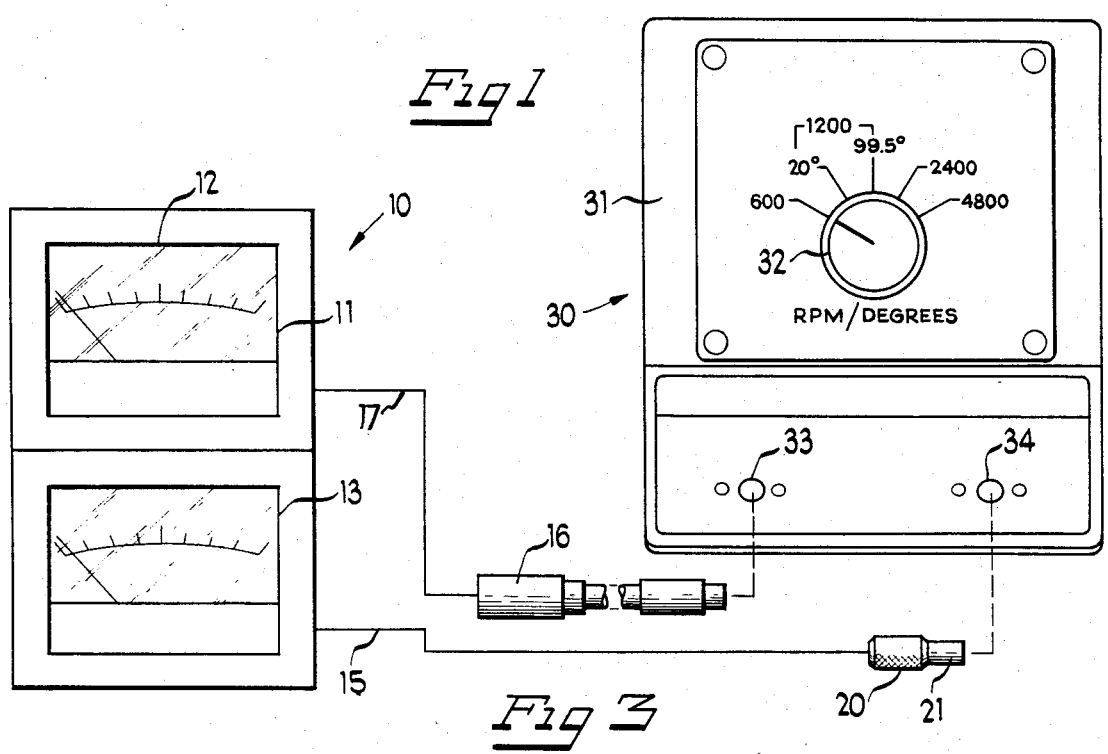
FIG. 1 depicts a diesel-engine-timing meter, and a calibrator therefor which incorporates the features of the present invention.

Referring now to the drawings and more particularly to FIG. 1 thereof, there is depicted a diesel-engine-timing meter 10 used to analyze and time a diesel engine (not shown). Each cylinder in the engine has an associated prechamber which in turn has a threaded opening to accommodate a glow plug. The glow plug for a selected cylinder is removed for the purpose of using the timing meter 10 and replaced by a luminosity probe (not shown). The meter 10 includes a housing 11 which carries a display 12 for displaying speed of the engine in rpm. A second display 13 in the housing 11 displays in degrees the amount of timing angle of the diesel engine being timed. The meter 10 includes an optical detector 20 with a tubular extension 21 for connection to the luminosity probe. The luminosity probe transmits the light occurring during the combustion event to the detector 20. The detector 20 has a transducer which converts the light into an electrical signal on the conductor 15.

The crankshaft for the engine has a rotating wheel attached thereto. The manufacturer provides a notch in the wheel which passes a receptacle at a predetermined number of degrees after the piston in the selected cylinder reaches top dead center. The meter 10 includes a magnetic probe 16 connected by means of a conductor 17. When the engine is being analyzed, the magnetic probe 16 magnetically responds to the notch in the rotating wheel to provide an electrical signal on the conductor 17. The receptacle is so located that the notch passes it a certain number of degrees after top dead center.

To calibrate the timing meter 10, there is provided a calibrator 30 which has a front panel 31. On the panel 31 is a knob 32 having five positions corresponding to four engine speeds and two timing angles. The calibrator 30 produces a first train of pulses at the rate of 600 pulses per minute (i.e. 600 rpm), 1,200 rpm, 2,400 rpm and 4,800 rpm in the example depicted in FIG. 1. At 1,200 rpm, the calibrator 30 produces a second train of pulses which leads the first train by either 20° or 99.5° depending on the knob setting. The first train of pulses appears at the jack 33 and the second train appears at the jack 34. The jack 33 is adapted to receive the probe 16 of the timing meter 10, while the jack 34 is adapted to receive the tubular extension 21.

Figure 2:
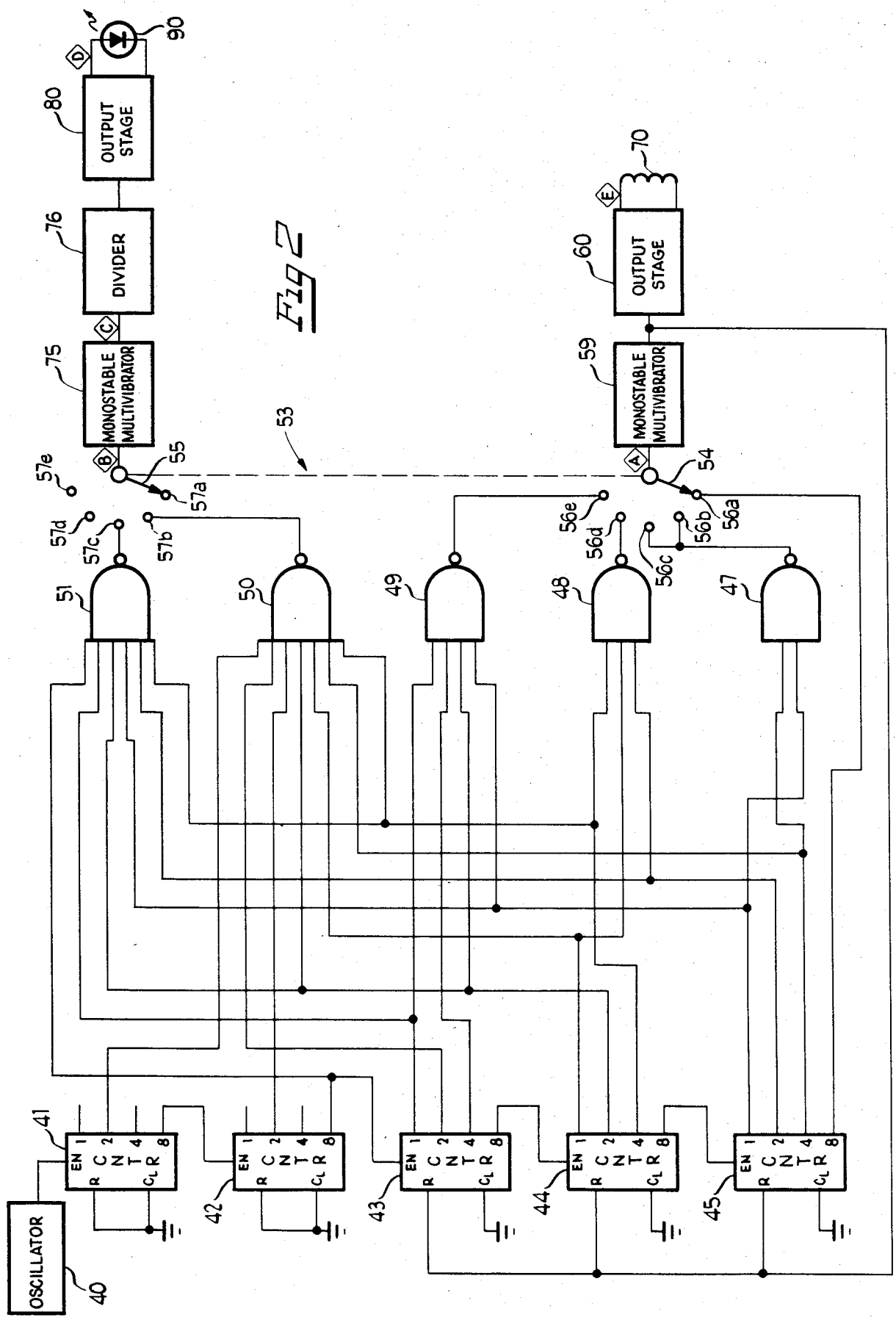
FIG. 2 is a logic and block diagram of the calibrator.

Turning now to FIG. 2, the calibrator 30 comprises an oscillator 40 for generating pulses at a frequency of 1 mHz., for example. The calibrator 30 further comprises five cascaded counters 41, 42, 43, 44 and 45, each preferably being of the dual BCD-up type (No. 4518B). Each of the counters 41–5 has a reset input, a clock input, an enable input and a set of four binary outputs "1", "2", "4" and "8". The enable input of the counter 41 is coupled to the oscillator 40 and the enable input of each succeeding counter is coupled to the "8" output of the preceding counter. The clock inputs of the five counters are grounded. The reset inputs of the counters 41 and 42 are also grounded so that they are free running. The reset inputs of the counters 43, 44 and 45 are reset periodically as will be described.

The counter 41 provides electrical signals on its outputs corresponding to the units digit in the number of counted pulses from the oscillator 40. The counter 42 provides electrical signals on its outputs corresponding to the tens digit, the counter 43 provides signals corresponding to the hundreds digit, the counter 44 provides signals corresponding to the thousands digit, and the counter 45 provides electrical signals corresponding to the ten thousands digit. Thus, a count of 5 pulses would cause the "1" and "4" outputs of the counter 41 to become high while all the other outputs of the counters 41–5 would remain low. A count of 6,000 pulses would be manifest as the "2" and "4" outputs of the counter 44 being high while all the rest remain low.

Every engine speed can be translated to a number of pulses to be counted. For example, 1,200 rpm corresponds to a count of 50,000 pulses, (1,000,000 pulses per second divided by 1,200 rpm multiplied by 60 seconds per minute). Similarly, 600 rpm corresponds to a count of 100,000 pulses; 2,400 rpm corresponds to 25,000 pulses; and 4,800 rpm corresponds to 12,500 pulses. In order to produce a response only upon occurrence of the 50,000th pulse, a NAND gate 47 (AND gate with inverted output) has inputs respectively coupled to the "1" and "4" outputs of the counter 45. When both of such outputs become high upon occurrence of the 50,000th pulse, a negative transition appears on the output of the NAND gate 47. A NAND gate 48 has inputs coupled to the "2" output of the counter 45 and the "1" and "4" outputs of the counter 44, whereby a negative transition appears on the output of the NAND gate 48 on the occurrence of the 25,000th pulse. A NAND gate 49 has inputs coupled to the "1" output of the counter 45, to the "2" output of the counter 44 and to the "1" and "4" outputs of the counter 43, whereby a negative transition appears on the output of the NAND gate 49 on the 12,500th pulse. The "8" output of the counter 45 becomes high on the 80,000th pulse and remains high until the start of the 100,000th pulse at which time a negative transition appears.

A switch 53 has ganged movable contacts 54 and 55 and corresponding sets of stationary contacts 56a–e and 57a–e. The "8" output of the counter 45 is connected to the stationary contact 56a while the NAND gate 47 is coupled to the contacts 56b and 56c, the NAND gate 48 is coupled to the contact 56b and the NAND gate 49 is coupled to the contact 56d.

By operation of the switch 53, a selected one of the negative transitions is applied to a monostable multivibrator 59 which responds to the negative transition applied thereto to produce a pulse having predetermined duration. The output of the monostable multivibrator 59 is coupled to an output stage 60 and is also coupled to the reset inputs of the counters 43, 44 and 45. The pulse out of the monostable multivibrator 59 occurs in time coincidence with the negative transition applied to the selected one of the contacts 56a–e to cause the counters to start counting anew. In the position of the switch 53 in FIG. 2, a negative transition is applied to the contact 56a on the 100,000th pulse at which time the counters 43, 44 and 45 are reset. The next 100,000th pulse will produce another negative transition at the contact 54. Accordingly, there appears at the output of the monostable multivibrator 59 a train of pulses each having a duration determined by the components of the monostable multivibrator 59 at a frequency of 600 pulses per minute (1 mHz divided by 100,000 pulses times 60 seconds per minute). When the contact 54 engages the contacts 56b or 56c, the monostable multivibrator 59 pulse rate is 1,200 ppm (1 mHz divided by 50,000 times 60). When the contacts 54 and 56d are engaged, the rate will be 2,400 ppm, and when the contacts 54 and 56e are engaged, the pulse rate will be 4,800 ppm.

The timing of the monostable multivibrator 59 is such that the pulses produced thereby are wide enough to insure that the counters 43, 44 and 45 will be reset, and narrow enough that it is terminated prior to when counters 43, 44 and 45 start to count, i.e. less than 100 μs. In an operative embodiment, the duration of each pulse was 50 μs. Although FIG. 2 depicts only the counters 43, 44 and 45 being reset, the other two counters could be reset also but that would require a narrower reset pulse.

The train of pulses from the multivibrator 59 is amplified and buffered in an output stage 60 and applied to a magnetic pickup coil 70 causing excitation thereof at the pulse rate. When the magnetic probe 16 is inserted into the jack 33 (FIG. 1), such excitation is transmitted to the probe and the meter display 12 will indicate the corresponding pulse rate. If the displayed rate does not match the selected pulse rate, then the meter is out of calibration. The meter would then be adjusted until it was in calibration.

These four engine speeds are merely exemplary and pulse rates corresponding to additional and/or different engine speeds can be generated using the principles described.

The calibrator 30 also has capability of checking the readings on the timing display 13. As explained earlier in the application, the timing angle in an engine corresponds to the time period between combustion and top dead center of a selected cylinder. If the timing angle is 20°, then combustion occurs 20° before top dead center. To determine whether the timing display 13 is accurate, the calibrator 30 produces a train of pulses respectively occurring a known number of degrees of engine rotation prior to top dead center. At 1,200 rpm, 50,000 pulses from the oscillator 40 are counted before the counters 43-5 are reset. During each degree of rotation 138.89 pulses are counted (50,000 pulses divided by 360°). During 20° of rotation, 2,778 pulses are counted (138.89 pulses times 20°). In other words, reaching a count of 47,222 pulses (50,000−2,778) would take place 20° before reaching a count of 50,000 pulses.

In FIG. 2, a NAND gate 50 has its inputs coupled to the "4" output of the counter 45, the "4", "2" and "1" outputs of the counter 44, and the "2" outputs of the counters 43, 42, and 41. Accordingly, the NAND gate 50 produces a negative going transition on the 47,222nd pulse. The negative transition is applied to the fixed contact 57b of the switch 53.

A NAND gate 51 has its inputs coupled to the "1" and "2" outputs of the counter 45, the "2" and "4" outputs of the counter 44, the "1" output of the counter 43, and the "8" output of the counter 42. Accordingly, the NAND gate 51 supplies a negative transition on the 36,180th pulse. The negative transition is applied to the fixed contact 57c of the switch 53. A count of 36,180 pulses corresponds to a timing angle of 99.5° (50,000 pulses−138.89 pulses per degree times 99.5°=36,180).

By operation of the switch 53, a selected one of the negative transitions is applied to a monostable multivibrator 75 which responds to the negative transition applied thereto to produce a pulse having predetermined duration. The pulse out of the monostable multivibrator 75 occurs in time coincidence with the negative transition applied to a selected one of the contacts 57b, c. When the contact 55 is moved to engage the contact 57b, a pulse is produced by the monostable multivibrator 75 on the 47,222th pulse. Because the contact 54 engages the contact 56b, the 50,000th pulse causes the counters 43-5 to be reset. Upon the 47,222th pulse after reset, another negative transition will be generated to cause the monostable multivibrator 75 to produce another pulse. Accordingly, there appears at the output of the monostable multivibrator 75 a train of pulses each having a duration determined by the components of the monostable multivibrator 75, at a frequency of 1,200 ppm, each pulse leading the corresponding pulse produced by the monostable multivibrator 59 by 20° or 2,778 pulses. When the contact 55 is in engagement with the contact 57c, the monostable multivibrator 75 pulse rate is still 1,200 ppm but with the lead angle being 99.5° or 13,820 pulses.

These two timing angles are merely exemplary and additional or other angles can be generated, using the principles described. Also, although the 1,200 ppm rate is utilized at the two angles of 20° and 99.5°, those timing angles can be simulated at different engine speeds.

The monostable multivibrator 75 insures response only to the first negative transition from the NAND gates 50 and 51. Such negative transition occurs on the output of the NAND gate on the 47,222th pulse. However, another negative transition will occur on the 47,223rd pulse, the 47,226th pulse, etc. The duration of the pulse from the multivibrator 75 should be such as to exceed the time between the first negative transition and the negative transition corresponding to the top-dead-center event. In an operative example, the pulse had a duration of 60.2 ms. corresponding to a timing angle of 116°. By the same token, subsequent negative transitions produced by the output of the NAND gate 51 will have no effect on circuitry following the multivibrator 75.

The train of pulses from the divider 76 is amplified and buffered in an output stage 80 and applied to an LED 90 causing same to flash at the pulse rate. When the luminosity probe is inserted into the jack 34 (FIG. 1), such flashes are transmitted to the probe and the meter display 13 will indicate the corresponding pulse rate. If the display rate does not match the selected pulse rate, then the meter is out of calibration.

Figure 3:
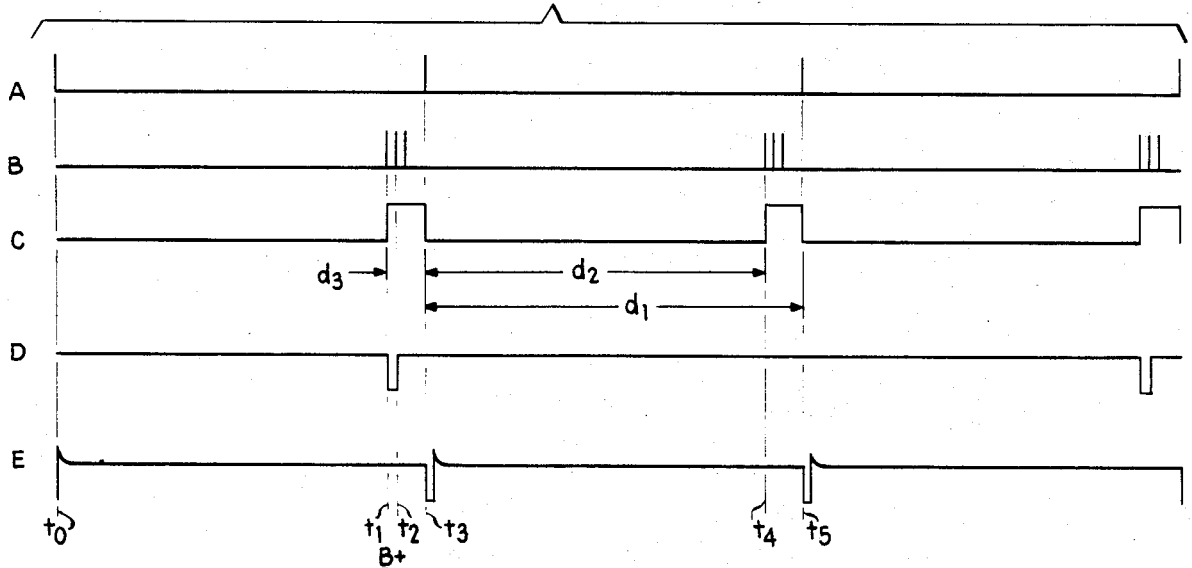
FIG. 3 depicts wave forms of the signals at various points in the diagram of FIG. 2.

FIG. 3 depicts wave forms at various points in the diagram of FIG. 2 labelled with capital letters inside diamonds. All the timing diagrams start at time $t_0$. At $t_3$ and $t_5$ pulses from the selected NAND gate 47, 48 or 49 are applied to the monostable multivibrator 59 as shown in FIG. 3A. Preceding each such pulse by a duration $d_3$ is a pulse from the selected one of the NAND gates 50 and 51 as shown in FIG. 3B. The next pulse occurring at time $t_2$ and the following pulse are ignored by virtue of the action of the monostable multivibrator 75 producing the pulses shown in FIG. 3C. The duration $d_1$ signifies the time between successive pulses which may be expressed in terms of the number of oscillator pulses. For example, when the NAND gate 47 is selected, $d_1$ is equivalent to 50,000 oscillator pulses. The duration $d_2$ signifies the number of oscillator pulses to count until a pulse is applied to the monostable multivibrator 75. If, for example, the NAND gate 50 is selected, $d_2$ would be 47,222 pulses. In such case, $d_3$ is equivalent to 2,778 pulses. FIG. 3D depicts the pulses which excite the LED and their frequency is one-half the frequency of the pulses depicted in FIG. 3C. FIG. 3E depicts the pulses that excite the coil 70 and their frequency is the same as that depicted in FIG. 3C.

Figure 4:
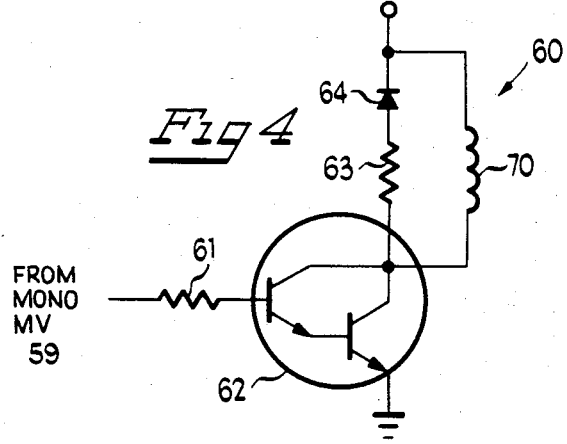
FIG. 4 is a schematic diagram of certain electronic circuitry in the calibrator of FIG. 2.
Figure 5:
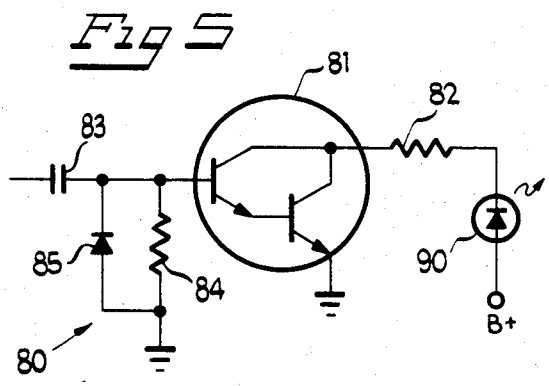
FIG. 5 is a schematic diagram of other electronic circuitry in the calibrator of FIG. 2.

FIG. 4 depicts details of an exemplary output stage 60. A Darlington pair 62 is connected in series with a diode 64 and a resistor 63 between the supply voltage and ground. The diode 64 protects the Darlington pair 62 when the field in the coil 70 collapses. The monostable multivibrator 59 is connected to the input of the Darlington pair 62 by way of a resistor 61. FIG. 5 gives details of an exemplary output stage 80. A Darlington pair 81 is connected in series with a resistor 82 and the LED 90 between the supply voltage and ground. The divider 76 is connected to the Darlington pair 81 by means of a capacitor 83. A resistor 84 and a diode 85 are connected in parallel between the input of the Darlington pair and ground. The capacitor 83, the resistor 84 and the diode 85 provide some integration of the pulses applied to the Darlington pair 81.

Another embodiment of the invention is depicted in FIG. 6. The same oscillator 40 and counters 41–5 are employed. Programming diodes replace the NAND gates 47–51. The contact 55 is connected through an inverter 91a to the "set" input of a latch 92. The contact 54 is connected through an inverter 91b to the reset input of the latch 92. In the embodiment of FIG. 2, the monostable multivibrator 75 prevented subsequent pulses from the NAND gates 50 and 51 from having an effect on ensuing circuitry. The latch 92 performs such function in this embodiment. Specifically, the pulse from the contact 55 is received first and it sets the latch 92. Subsequent pulses have no effect until the latch 92 is reset. That occurs on reception of a pulse from the contact 54. Each time the latch 92 is set, a pulse is produced thereby. The train of pulses thereby produced is divided in half by a divider 93 to produce a train of pulses like that depicted in FIG. 3D. After being processed in the output stage 80, the pulses excite the LED 90. The pulses used for exciting the coil 70 are lengthened slightly in a delay circuit 94 and applied to an output stage 60' which is slightly modified over the output stage 60 in the embodiment of FIG. 2. Details of the blocks of FIG. 6 are depicted in FIG. 7.

Referring now to FIG. 8, details of the programming diodes will be described. Instead of the NAND gates shown in FIG. 2, the AND function is performed by sets of diodes. A first set of two diodes 100 connects inputs from the counter 45 to a bus 101. A set of three diodes 102 connects inputs from the counters 44 and 45 to a bus 103. A set of four diodes connects inputs from the counters 43–45 to a bus 105. A set of seven diodes 106 connects inputs from the counters 41–45 to a bus 107, and a set of six diodes 108 connects outputs of the counters 41–5 to a bus 109. The cathodes of the diodes 100 are connected to the same counter outputs as the NAND gate 47; the cathodes of the diodes 102 are connected to the same counter outputs as the NAND gate 48, the diodes 104 are connected to the same counter outputs as the NAND gate 49; the diodes 106 are connected to the same counter outputs as the NAND gate 50; and the cathodes of the diodes 108 are connected to the same counter outputs as the NAND gate 51. Each of the buses is connected by way of a resistor to the B+supply voltage. Accordingly, each bus is maintained normally low and when all the counter outputs associated with a particular set of diodes becomes high, a positive transition appears on the corresponding bus for application to the respective fixed contacts.

Although the above description has been in connection with a calibrator for a diesel-engine-timing meter, it is to be understood that the principles are applicable to a calibrator or calibration checker for any kind of timing meter where two trains of pulses are to be generated one separated from the other to simulate advance, retard, timing angle, etc. of an engine. The engine speed and the timing angle can be simulated very precisely to any desired value by appropriate selection of the counter outputs.

We claim:

1. A calibrator for a timing meter which includes a combustion detector for producing a signal in response to the occurrence of combustion in an engine, a TDC detector for producing a signal in response to a top dead center event, a display for engine speed, and a display for timing angle, the calibrator being operative to check the engine speed display at least at first and second engine speeds and to check the timing angle display at least at first and second timing angles, the calibrator comprising an oscillator for generating a series of oscillator pulses, a plurality of cascaded counters responsive to pulses from said oscillator and generating outputs respectively corresponding to the decimal digits in the number of the oscillator pulses counted during a given period, each counter having a plurality of outputs on which appear electrical signals representing the numerical value of the digit corresponding to such counter, the first engine speed corresponding to electrical signals on a first set of outputs of said counters, the second engine speed corresponding to electrical signals on a second set of outputs of said counters, first circuit means responsive to the electrical signals on a selected one of said first and second sets of outputs to generate a reset signal and a speed enable signal, the reset inputs of at least some of said counters being coupled to said first circuit means and being responsive to the reset signal to become reset, inductive means coupled to said first circuit means and being responsive to the speed enable signal to produce an inductive signal for the TDC detector, the first timing angle corresponding to electrical signals on a third set of outputs of said counters, the second timing angle corresponding to electrical signals on a fourth set of outputs of said counters, second circuit means responsive to the electrical signals on a selected one of said third and fourth sets of outputs to generate a timing enable signal, and combustion simulation means coupled to said second circuit means and being responsive to the timing enable signal to produce a signal for the combustion detector.

2. The calibrator of claim 1, wherein the frequency of the oscillator pulses is 1 mHz.

3. The calibrator of claim 1, comprising five cascaded counters.

4. The calibrator of claim 1, wherein each of said counters is a BCD counter having four outputs.

5. The calibrator of claim 1, wherein said first circuit means includes a monostable multivibrator for producing a pulse of predetermined duration.

6. The calibrator of claim 5, wherein said predetermined duration is 50 $\mu$s.

7. The calibrator of claim 1, wherein the reset inputs of said counters corresponding to the first three digits are coupled to said first circuit means and are reset upon occurrence of the speed enable signal.

8. The calibrator of claim 1, wherein said first circuit means includes means for lengthening the reset signal.

9. The calibrator of claim 1, wherein said second circuit means includes a latch set by the selected timing signal and reset by the selected speed signal.

10. The calibrator of claim 1, wherein said second circuit means includes means for dividing the rate of occurrence of the combustion signal in half.

11. The calibrator of claim 1, wherein said second circuit means includes a monostable multivibrator for producing a pulse of predetermined duration.

12. A calibrator for a timing meter which includes a combustion detector for producing a signal in response to the occurrence of combustion in an engine, a TDC detector for producing a signal in response to a top dead center event, a display for engine speed, and a display for timing angle, the calibrator being operative to check the engine speed display at least at first and second engine speeds and to check the timing angle display at least at first and second timing angles, the calibrator comprising an oscillator for generating a series of oscillator pulses, a plurality of cascaded counters responsive to pulses from said oscillator and generating outputs respectively corresponding to the decimal digits in the number of the oscillator pulses counted during a given period, each counter having a plurality of outputs on which appear electrical signals representing the numerical value of the digit corresponding to such counter, the first engine speed corresponding to electrical signals on a first set of outputs of said counters, the second engine speed corresponding to electrical signals on a second set of outputs of said counters, at least first and second means for performing an AND function and generating a speed signal, said first means having inputs coupled to said first set of outputs and producing a first speed signal in the presence of electrical signals on said first set, said second means having inputs coupled to said second set of outputs and producing a second speed signal in the presence of electrical signals on said second set, first circuit means responsive to either speed signal to generate a reset signal and a speed enable signal, the reset inputs of at least some of said counters being coupled to said first circuit means and being responsive to the reset signal to become reset, first switch means for coupling a selected one of said first and second means to said first circuit means, inductive means coupled to said first circuit means and being responsive to the speed enable signal to produce an inductive signal for the TDC detecter, the first timing angle corresponding to electrical signals on a third set of outputs of said counters, the second timing angle corresponding to electrical signals on a fourth set of outputs of said counters, at least first and second timing AND means, said first timing AND means having inputs coupled to said third set of outputs and producing a first timing signal in the presence of electrical signals on said third set, said second timing AND means having inputs coupled to said fourth set of outputs and producing a second timing signal in the presence of electrical signals on said second set, second circuit means responsive to either timing signal to generate a timing enable signal, second switch means for coupling a selected one of said timing AND means to said second circuit means, and combustion simulation means coupled to said second circuit means and being responsive to the timing enable signal to produce a signal for the combustion detector.

13. The calibrator of claim 12, wherein each of said speed and timing AND means is an AND gate.

14. The calibrator of claim 12, wherein each of said speed and timing AND means includes diodes.

15. The calibrator of claim 12, adapted to check the engine speed display at a third engine speed, the third engine speed corresponding to electrical signals on a fifth set of outputs of said counters, and further comprising third speed AND means, said third speed AND means having inputs coupled to said fifth set of outputs and producing a third speed signal in the presence of electrical signals on said fifth set, said first switch means coupling a selected one of any of said speed AND means to said first circuit means.

16. The calibrator of claim 12, wherein said first and second switch means are ganged together.

* * * * *